United States Patent
Hsieh et al.

(10) Patent No.: US 9,514,706 B1
(45) Date of Patent: Dec. 6, 2016

(54) TRANSPARENT DISPLAY APPARATUS AND IMAGE ADJUSTMENT METHOD THEREOF

(71) Applicant: Chunghwa Picture Tubes, LTD., Taoyuan (TW)

(72) Inventors: Pei-Lin Hsieh, Taoyuan (TW); Hsiang-Tan Lin, Keelung (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 0 days.

(21) Appl. No.: 14/724,804

(22) Filed: May 28, 2015

(51) Int. Cl.
  G09G 5/00 (2006.01)
  G09G 5/02 (2006.01)
  G09G 5/06 (2006.01)
  H04N 1/60 (2006.01)
  H04N 9/76 (2006.01)

(52) U.S. Cl.
  CPC .............. *G09G 5/026* (2013.01); *G09G 5/006* (2013.01); *G09G 5/06* (2013.01); *G09G 2320/0242* (2013.01); *G09G 2320/066* (2013.01); *G09G 2320/0666* (2013.01); *G09G 2320/103* (2013.01)

(58) Field of Classification Search
  CPC combination set(s) only.
  See application file for complete search history.

(56) References Cited

U.S. PATENT DOCUMENTS

| 8,314,859 | B2 | 11/2012 | Kim et al. | |
|---|---|---|---|---|
| 2013/0207948 | A1* | 8/2013 | Na | G09G 3/003 345/207 |
| 2013/0300728 | A1* | 11/2013 | Reichow | G09G 3/36 345/419 |
| 2013/0314453 | A1* | 11/2013 | Ko | G09G 5/10 345/690 |
| 2014/0185129 | A1* | 7/2014 | Kim | H01L 51/5284 359/296 |
| 2014/0204023 | A1* | 7/2014 | Kumar | G06F 3/011 345/156 |
| 2014/0292825 | A1* | 10/2014 | Kim | G09G 3/003 345/690 |
| 2015/0009126 | A1 | 1/2015 | Nagara | |
| 2015/0062175 | A1* | 3/2015 | Kim | G09G 3/3648 345/639 |
| 2015/0228229 | A1* | 8/2015 | Priede | G09G 3/003 345/213 |
| 2015/0288933 | A1* | 10/2015 | Iversen | G06F 3/147 348/14.07 |
| 2015/0293654 | A1* | 10/2015 | Cho | G06F 3/04897 715/768 |

FOREIGN PATENT DOCUMENTS

| JP | 2012247548 | 12/2012 |
|---|---|---|
| TW | 201342326 | 10/2013 |

* cited by examiner

Primary Examiner — Wesner Sajous
(74) Attorney, Agent, or Firm — Jianq Chyun IP Office

(57) ABSTRACT

A transparent display apparatus and an image adjustment method thereof are provided. The image adjustment method includes following steps. A background image information is obtained according to a background scenery at a first side of the transparent display panel. At least one of a plurality of color attributes of a display image is adjusted according to the background image information. The adjusted display image is output at a second side of the transparent display panel.

17 Claims, 7 Drawing Sheets

TRANSPARENT DISPLAY APPARATUS AND IMAGE ADJUSTMENT METHOD THEREOF

BACKGROUND OF THE INVENTION

1. Field of the Invention

The present invention generally relates to an image processing technology, in particular, to a transparent display apparatus and an image adjustment method thereof.

2. Description of Related Art

Generally, liquid crystal displays (LCDs) can be broadly classified into three types, namely, transmissive, reflective and transflective LCDs. With increases in applications of the displays, transparent display panel has been developed in recent years. The transparent display panel has a sufficient transparency rate, and therefore a user can look through the transparent display panel and observe the background scenery behind the transparent display panel. In addition to the inherent transparent display function, the transparent display panel may also be applied as an information display.

However, the transparency properties may lead to certain issues. Specifically, a background scenery behind the transparent display panel may degrade the display effects of an image displayed on the transparent display panel. For instance, in a case of displaying an image of a red cherry with green leaves on the transparent display panel, it may be difficult to recognize the red cherry when the background scenery is composed of red roses. On the other hand, it may be difficult to recognize the green leaves when the background scenery is composed of green lawn. Thereby, the readability of the transparent display panel is significantly affected by the background scenery.

SUMMARY OF THE INVENTION

Accordingly, the present invention is directed to a transparent display apparatus and an image adjustment method thereof, which enhances the display effects of the image displayed on the transparent display panel, and thereby allows the user to recognize the display image clearly.

The invention provides an image adjustment method of a transparent display apparatus. The transparent display apparatus includes a transparent display panel. The image adjustment method includes the following steps. A background image information is obtained according to a background scenery at a first side of the transparent display panel. At least one of a plurality of color attributes of a display image is adjusted according to the background image information. The adjusted display image is output at a second side of the transparent display panel.

In an embodiment of the invention, the step of adjusting at least one of the color attributes of the display image according to the background image information includes following steps. A color difference between at least one display color of the display image and at least one background color of the background image information is compared. At least one of the color attributes of the display image is adjusted according to the color difference.

In an embodiment of the invention, the step of adjusting at least one of the color attributes of the display image according to the color difference includes following steps. The color difference and a threshold value is compared. At least one of the color attributes of the display image is adjusted according to a difference obtained by comparing the color difference and the threshold value.

In an embodiment of the invention, the step of comparing the color difference between the display color of the display image and the background color of the background image information includes following steps. The display color is converted into a first position in a color space. The background color is converted into a second position in the color space. A distance between the first position and the second position in the color space is calculated to obtain the color difference.

In an embodiment of the invention, the step of adjusting at least one of the color attributes of the display image according to the difference obtained by comparing the color difference and the threshold value includes following steps. When the color difference is smaller than the threshold value, the first position is shifted for changing at least one of the color attributes of the display color according to the difference between the color difference and the threshold value. When the color difference is not smaller than the threshold value, each of the color attributes of the display color is not changed.

In an embodiment of the invention, the transparent display panel further includes a background image capturing unit. The step of obtaining the background image information according to the background scenery at the first side of the transparent display panel includes following steps. The background scenery at the first side of the transparent display panel is captured to generate the background image information by the background image capturing unit.

In an embodiment of the invention, the color attribute includes saturation, contrast or lightness.

The invention provides another image adjustment method of a transparent display apparatus. The transparent display apparatus includes a transparent display panel. The image adjustment method includes the following steps. A background image information is obtained according to a background scenery at a first side of the transparent display panel. A display image of a second side of the transparent display panel and the background image information are compared to obtain a color difference. At least one of a plurality of color attributes of the display image is adjusted by comparing the color difference and a threshold value. The adjusted display image is output at the second side of the transparent display panel.

In an embodiment of the invention, the step of comparing the display image of the second side of the transparent display panel and the background image information to obtain the color difference includes following steps. At least one display color of the display image is converted into a first position in a color space. At least one background color of the background image is converted into a second position in the color space. A distance between the first position and the second position in the color space is calculated to obtain the color difference.

In an embodiment of the invention, the step of adjusting at least one of the color attributes of the display image by comparing the color difference and the threshold value includes following steps, when the color difference is smaller than the threshold value, the first position is shifted for changing at least one of the color attributes of the display color according to the difference between the color difference and the threshold value. When the color difference is not smaller than the threshold value, each of the color attributes of the display color is not changed.

In an embodiment of the invention, the transparent display apparatus further includes a background image capturing unit, and the step of obtaining the background image information according to the background scenery at the first side of the transparent display panel includes following step, the background scenery at the first side of the transparent display panel is captured to generate the background image information by the background image capturing unit.

In an embodiment of the invention, the color attribute includes saturation, contrast or lightness.

The invention provides a transparent display apparatus, including a transparent display panel and a processing unit. The transparent display panel has a first side and a second side. The processing unit is coupled to the transparent display panel. The processing unit obtains a background image information according to a background scenery at the first side of the transparent display panel, adjusts at least one of a plurality of color attributes of a display image according to the background image information, and outputs the adjusted display image at the second side of the transparent display panel.

In an embodiment of the invention, the processing unit compares a color difference between at least one display color of the display image and at least one background color of the background image information, and adjusts at least one of the color attributes of the display image according to the color difference.

In an embodiment of the invention, the processing unit compares the color difference and a threshold value, and adjusts at least one of the color attributes of the display image according to a difference obtained by comparing the color difference and the threshold value.

In an embodiment of the invention, the processing unit converts the display color into a first position in a color space, converts the background color into a second position in the color space, and calculates a distance between the first position and the second position in the color space to obtain the color difference.

In an embodiment of the invention, when the color difference is smaller than the threshold value, the processing unit shifts the first position for changing at least one of the color attributes of the display color according to the difference between the color difference and the threshold value. When the color difference is not smaller than the threshold value, the processing unit do not change each of the color attributes of the display color.

In an embodiment of the invention, the transparent display apparatus further includes a background image capturing unit, which is coupled to the processing unit. The background image capturing unit captures the background scenery at the first side of the transparent display apparatus to generate the background image information.

In an embodiment of the invention, the color attributes comprises saturation, contrast and lightness.

Based on the above, the transparent display apparatus and the image adjustment method thereof disclosed by the embodiments of the invention adaptively adjusts at least one of the color attributes of the display image according to the background image information. Thereby, the color difference between the display image and the background image may be increased for easy recognition and further enhance readability of the display image on the transparent display panel.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
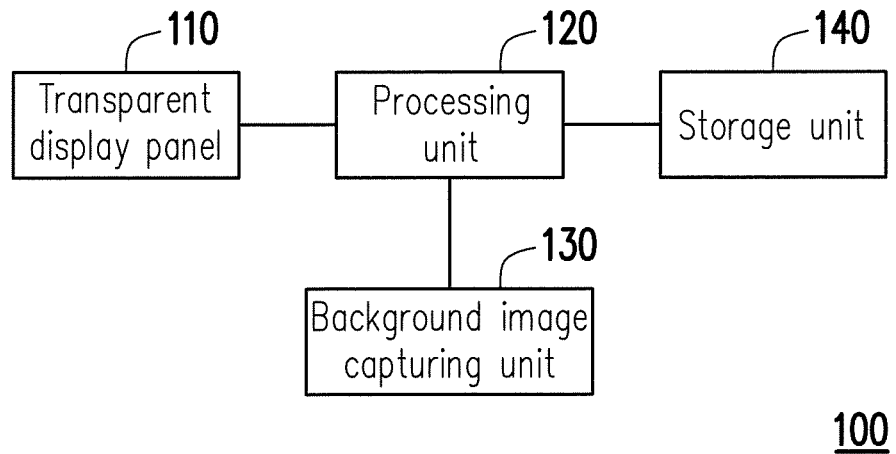
FIG. 1 is a block diagram illustrating a transparent display apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

For a transparent display apparatus, when a display color of a display image displayed on the transparent display apparatus and a background color of a background scenery behind the transparent display apparatus are similar, it may be difficult for a user to recognize the display image clearly. In order to solve the problem, the embodiments of the present invention determine whether the display color is recognizable with respect to the background color by analyzing a color difference between the display color and the background color. When the color difference is too small and thus the display color is hard to be recognized, the embodiments of the present invention may adaptively adjust at least one color attribute of the display color to increase the color difference. Therefore, the display effects of the display image may be enhanced, and the user may recognize the display image clearly.

FIG. 1 is a block diagram illustrating a transparent display apparatus according to an embodiment of the invention. Referring to FIG. 1, the transparent display apparatus 100 includes a transparent display panel 110, a processing unit 120 and a background image capturing unit 130, where the functionalities thereof are given as follows.

The transparent display panel 110 may be characterized by transparency, such as a liquid crystal display (LCD) panel or an organic light-emitting diode (OLED) display panel. The transparent display panel 110 may have a first side S1 and a second side S2. In the present embodiment, the first side S1 may correspond to the side closer to the background scenery (e.g. the back of the transparent display panel 110), while the second side S2 may correspond to the side closer to the user for displaying (e.g. the front of the transparent display panel 110).

The processing unit 120 may be, for example, a single chip, a general-purpose processor, a special-purpose processor, a traditional processor, a digital signal processor (DSP), a plurality of microprocessors, or one or more microprocessors, controllers, microcontrollers, application specific integrated circuit (ASIC), or field programmable gate arrays (FPGA) with a DSP core. In the present embodiment, the processing unit 120 is configured to implement the proposed method for adjusting the image displayed on the transparent display panel 110.

The background image capturing unit 130, for example, can include fixed focus optical lens or optical zoom lens, and a photosensitive element, such as a charge coupled device (CCD) or complementary metal-oxide semiconductor (CMOS). The background image capturing unit 130 is coupled to the processing unit 120. In the present embodiment, the background image capturing unit 130 may capture the background scenery at the first side S1 of the transparent display panel 110 to generate the background image information. For example, when the first side S1 is the back of the transparent display panel 110, the background image capturing unit 130 may be set toward the back of the transparent display panel 110 for directionally capturing the background scenery behind the transparent display panel 110.

Moreover, the transparent display apparatus 100 may also include a storage unit 140, and yet the invention is not limited herein. The storage unit 140 is configured to store data and accessible by the processing unit 120. The storage unit 140 may be, for example, a hard disk drive (HDD), a volatile memory, or a non-volatile memory.

Figure 2:
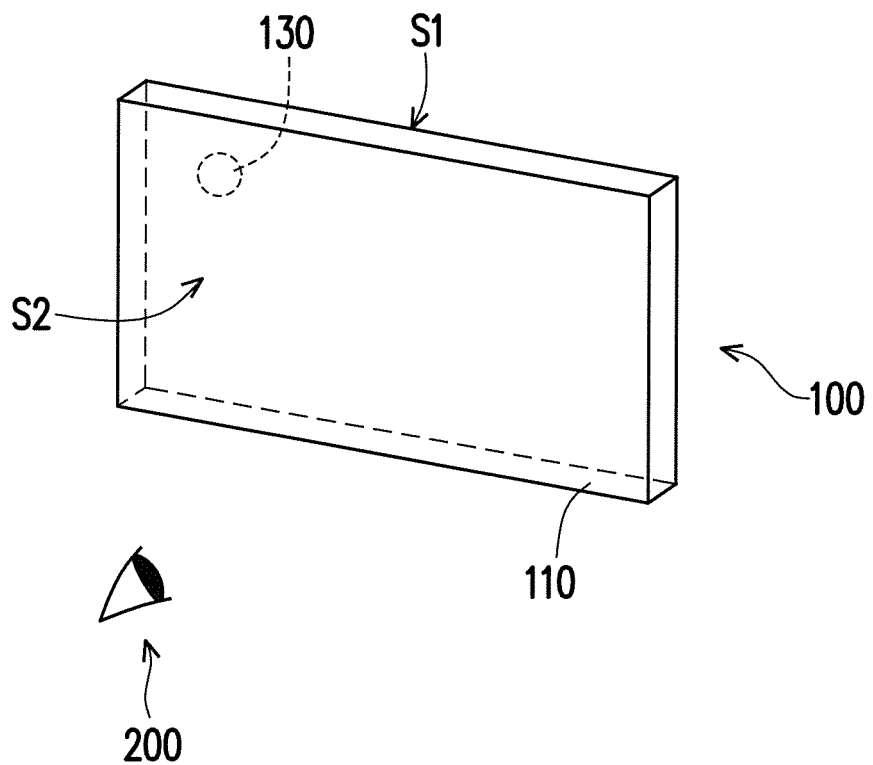
FIG. 2 is a schematic diagram illustrating a transparent display apparatus according to an embodiment of the invention.

FIG. 2 is a schematic diagram illustrating a transparent display apparatus according to an embodiment of the invention, which illustrates an exemplary configuration of the aforementioned components in the transparent display apparatus 100. It should be noted that, for convenience, only the transparent display panel 110 and the background image capturing unit 130 of the transparent display apparatus 100 are illustrated in FIG. 2.

Referring to FIG. 2, a user 200 may be located in front of the transparent display apparatus 100 and watch the display image displayed on the transparent display panel 110. In the present embodiment, the processing unit 120 may output the display image at the front side (i.e. the second side S2) of the transparent display panel 110.

In addition, a background scenery at the back side (i.e. the first side S1) of the transparent display panel 110 may be visible to the user 200 due to the high transparency rate of the transparent display apparatus 100. In order to capturing the background scenery conveniently to generate the background image information, the background image capturing unit 130 may be configured to the back side of the transparent display apparatus 100. In the present embodiment, the background image capturing unit 130 may be set at the upper-left of the transparent display apparatus 100. However, the invention is not intended to limit the configuration of the background image capturing unit 130 in the transparent display apparatus 100. Thereby, based on the above device architecture, the present embodiment may adjust the display image and then output the adjusted display image to display at the second side S2 of the transparent display panel 110 in consideration of the influence from the background image information, so as to enhance the readability of the display image displayed on the transparent display panel 110.

It is worth mentioning that, in the embodiment of FIG. 2, the first side S1 and the second side S2 of the transparent display panel 110 may be utilized for described the relative position among the display image and the background image. In other embodiment, the first side S1 and the second side S2 may be adaptively used to indicate other regions of the transparent display panel 110 respectively, depending on the position where the display image is outputted, and the invention is not intend to limit thereto.

Figure 3:
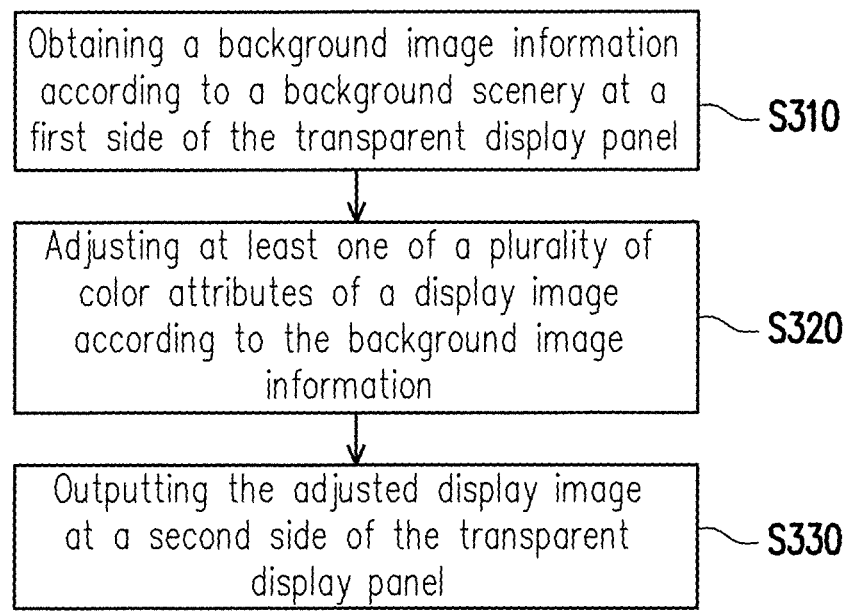
FIG. 3 is a flow chart illustrating an image adjustment method of a transparent display apparatus according to an embodiment of the invention.

FIG. 3 is a flow chart illustrating an image adjustment method of a transparent display apparatus according to an embodiment of the invention, which is adapted to the transparent display apparatus 100 in FIG. 1 and FIG. 2. Detailed steps of the proposed method will be illustrated along with the components of the transparent display apparatus 100 hereafter.

Referring to FIG. 1 to FIG. 3, in Step S310, the processing unit 120 obtains a background image information according to a background scenery at a first side S1 of the transparent display panel 110. In the present embodiment, the background image information may be generated by the background image capturing unit 130, as described above. The background image information may include one or more background colors in the background scenery. Besides, the background image information may also include location information of the background color in the background scenery.

In Step S320, the processing unit 120 adjusts at least one of a plurality of color attributes of a display image according to the background image information. In Step S330, the processing unit 120 outputs the adjusted display image at a second side S2 of the transparent display panel 110. The color attribute may include, for example, saturation, contrast or lightness.

Specifically, in an embodiment, the processing unit 120 may compare a color difference between at least one display color of the display image and at least one background color of the background image information, and then may adjust at least one of the color attributes of the display image according to the color difference. Further, the processing unit 120 may compare the color difference and a threshold value, and adjust at least one of the color attributes of the display image according to a difference obtained by comparing the color difference and the threshold value.

Taking the display image including one display color for instance, the processing unit 120 may analyze the background image information, determine a region overlapped with the display image, and then obtain the background color depending on the color of the overlapped region. Then, the processing unit 120 may use coordinates defined by a color space to represent the display color and the background color respectively, and then calculate the color difference based on the color space.

In the present embodiment, a threshold value is used for determining whether the color difference may be recognized by the user 200. Specifically, the threshold value may be a minimal color variation that can be sensed by human eyes. More particularly, the threshold value may be, for example, a just-noticeable difference (JND). Therefore, when the color difference does not satisfy the threshold value, the processing unit 120 may calculate a difference between the color difference and the threshold value, and use the difference between the color difference and the threshold value to adjust at least one of saturation, contrast and lightness (i.e. the color attributes) of the display image, so as to make the display color recognizable with respect to the background color for the user 200.

Accordingly, the present embodiment may determine to adjust the output display image on the second side S2 of the transparent display panel 110 according to the background scenery at the first side S1 of the transparent display panel 110, in particular, according to the color difference between the display color and the background color. Thereby, the adjusted display image may be easily recognized by the user 200, and the display effects of the display image may be improved.

It should be noted that although the aforementioned embodiment merely illustrates the case of one display color included in the display image, the case of multiple display color included in the display image may also be adapted.

Figure 4:
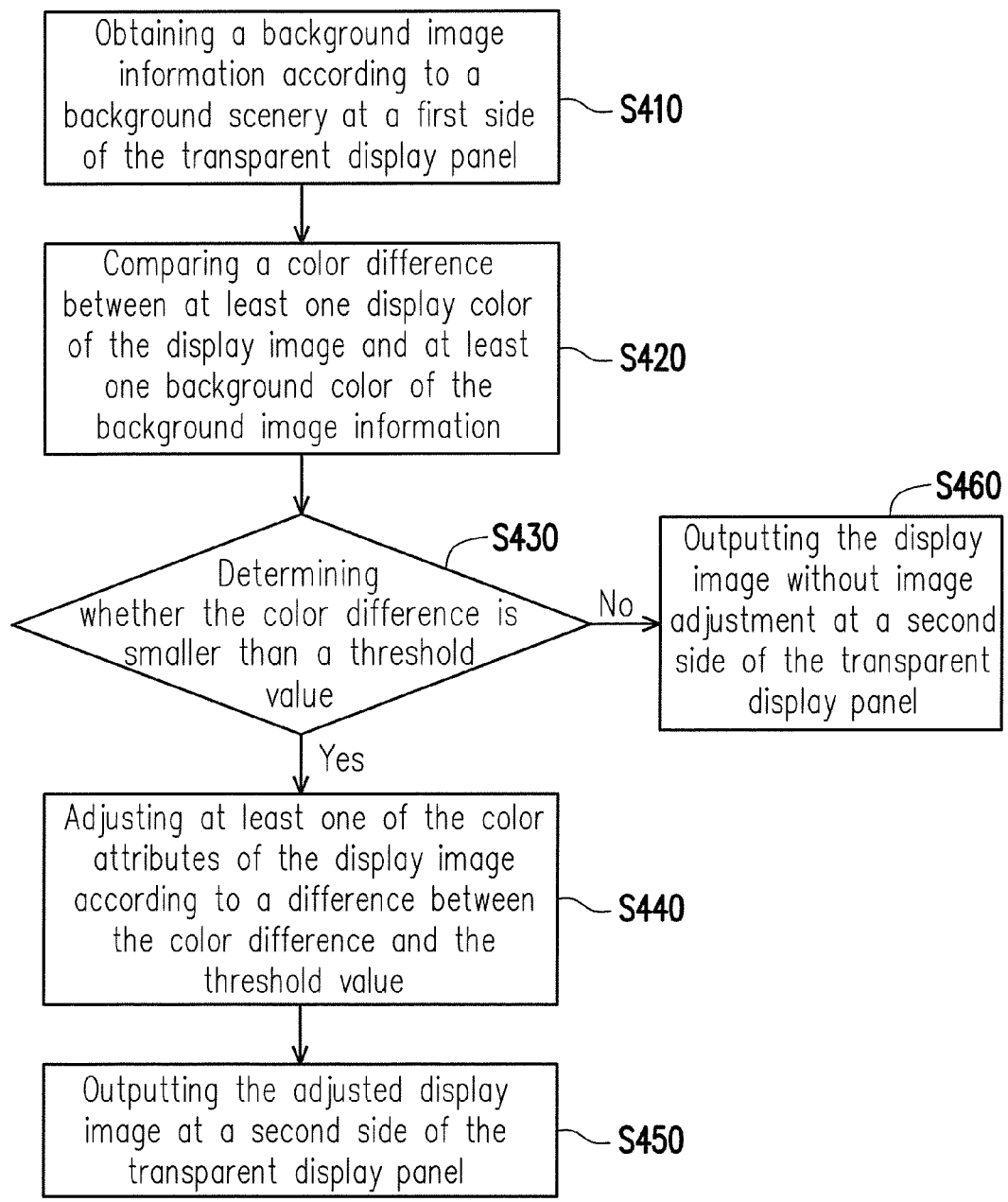
FIG. 4 is a flow chart illustrating an image adjustment method of a transparent display apparatus according to another embodiment of the invention.

FIG. 4 is a flow chart illustrating an image adjustment method of a transparent display apparatus according to another embodiment of the invention, which is also adapted to the transparent display apparatus 100 in FIG. 1 and FIG. 2.

Referring to FIG. 4, in Step S410, the processing unit 120 obtains a background image information according to a background scenery at a first side S1 of the transparent display panel 110. Step S410 may be similar to Step S310 of the embodiment in FIG. 3, so the details are not mentioned here.

In Step S420, the processing unit 120 compares a display image of a second side S2 of the transparent display panel 110 and the background image information to obtain a color difference. Specifically, the processing unit 120 may respectively execute a color-space conversion operation to convert at least one display color of the display image and at least one background color of the background image information into in a same color-space to calculate the color difference. For instance, the processing unit 120 may convert the display color into a first position in a color space and convert the background color into a second position in the color space. Then, the processing unit 120 may calculate a distance between the first position and the second position in the color space to obtain the color difference. The color space may be two dimensional or three dimensional, where the invention is not intend to limit thereto.

Figure 5:
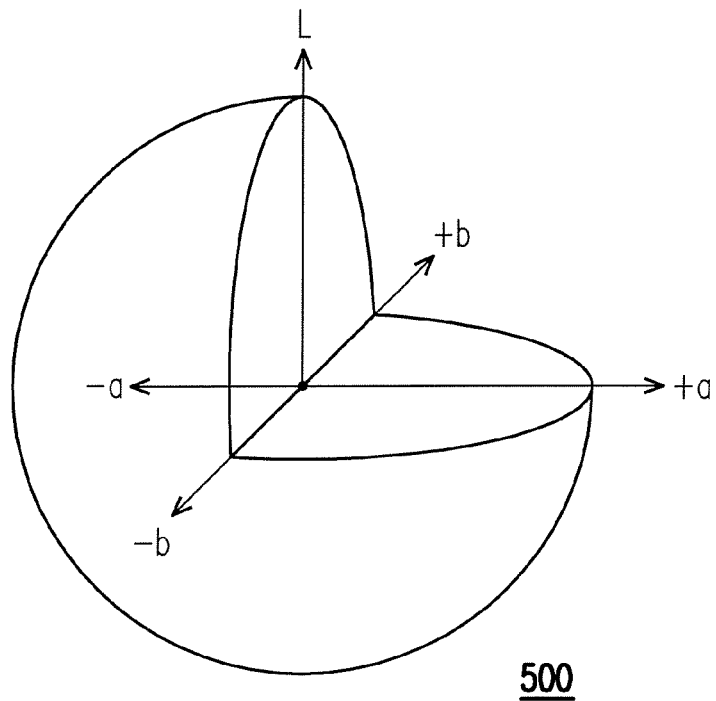
FIG. 5 is a schematic diagram illustrating a color space according to an embodiment of the invention.
Figure 6:
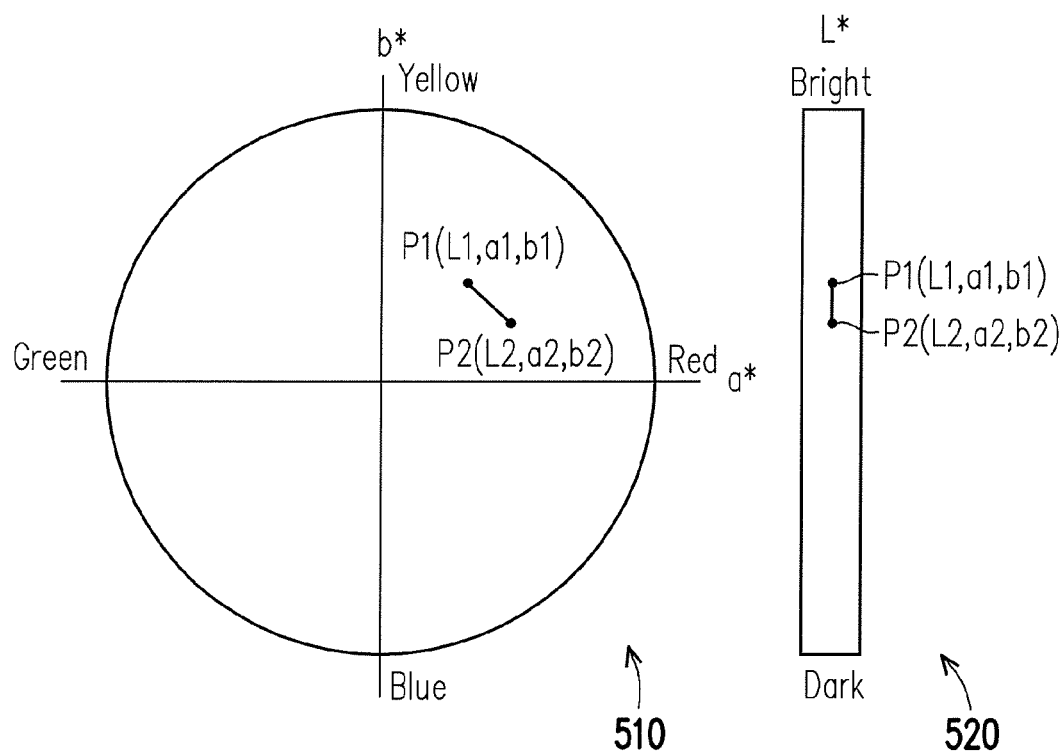
FIG. 6 is a schematic diagram illustrating a calculation of a color difference according to the embodiment of FIG. 5.

The following is an example as shown in FIG. 5 and FIG. 6. FIG. 5 is a schematic diagram illustrating a color space according to an embodiment of the invention, and FIG. 6 is a schematic diagram illustrating a calculation of a color difference according to the embodiment of FIG. 5. Referring to FIG. 5, a color space 500 may be, for instance, L*a*b* color space, which is formed with dimension L represented for lightness and dimensions a and b represented for color. In the color space 500, the a* axis with a values from −500 to 500 may be used for illustrating the red/green opponent colors, where the negative a (e.g. −a) values may be represented for green and the positive a (e.g. +a) values may be represented for red. In addition, the b* axis with b values from −200 to 200 may be used for illustrating the yellow/blue opponent colors, where the negative b (e.g. −b) values may be represented for blue and the positive b (e.g. +b) values may be represented for yellow. Besides, the L* axis with L values from 0 to 100 may be used for illustrating the darkest black and brightness white. It is worthy mentioning that a unit length of the a* axis, a unit length of the b* axis and a unit length of the L axis may be different, where the unit length of the a* axis indicates a distance between two continuous integers on the a* axis, the unit length of the b* axis indicates a distance between two continuous integers on the b* axis, and the unit length of the L* axis indicates a distance between two continuous integers on the L* axis. Based on the above, the processing unit 120 may use each of positions in the color space 500 for indicating a particular color.

Next, referring to FIG. 6, the color space 500 may also be represented by a two-dimensional depiction 510 for a chromaticity diagram and a one-dimensional depiction 520 for the lightness diagram. When the processing unit 120 converts the display color into the position P1 (expressed as $(L_1, a_1, b_1)$) in the color space 500, and converts the background color into the position P2 (expressed as $(L_2, a_2, b_2)$) in the color space 500, a distance D between the position P1 and P2 may be treated as the color difference between the display color and the background color. In the present embodiment, the distance D may be calculated by an equation (1): $D=(\Delta L^2+\Delta a^2+\Delta b^2)^{1/2}$, where $\Delta L=L_1-L_2$, $\Delta a=a_1-a_2$, and $\Delta b=b_1-b_2$. Then, the processing unit 120 may use the distance D to determine whether the display color is easily recognized by human eyes respective to the background color.

Referring to FIG. 4 again, in Step S430, the processing unit 120 determines whether the color difference is smaller than a threshold value. Similar to the aforementioned embodiments, the threshold value may be the minimal color variation that can be sensed by human eyes. Particularly, the threshold value may be determined based on the utilized color space. In the case of the L*a*b* color space, the minimal color variation (i.e. the just-noticeable difference) may be a value of 3, based on a unit of color difference qualified by National Bureau of Standard (NBS). Hence, the threshold value may be set as 3 in the present embodiment.

It should be noticed that the color spaces may also be, for example, RGB color space, xyY color space, or XYZ color space, and therefore the threshold value may be adaptively changed with different color spaces.

Please continue the flow illustrated in FIG. 4, when the color difference is smaller than the threshold value, in Step S440, the processing unit 120 adjusts at least one of the color attributes of the display image according to a difference between the color difference and the threshold value. Specifically, the processing unit 120 may adjust at least one of the color attributes of the display image based on the dimensions of the color space. Taking the color space 500 in FIG. 5 and FIG. 6 as an example, the processing unit 120 may shift the position P1 to increase the distance D between the position P1 and P2, so as to increase the color difference between the display color and the background color. Since the color space 500 may be formed with the dimensions of lightness and chromaticity, the processing unit 120 may execute the aforementioned shifting operation to shift the position P1 for changing at least one of lightness, saturation and contrast of the display color. Three examples are respectively illustrated in FIG. 7A, FIG. 7B and FIG. 7C as follows.

Figure 7A:
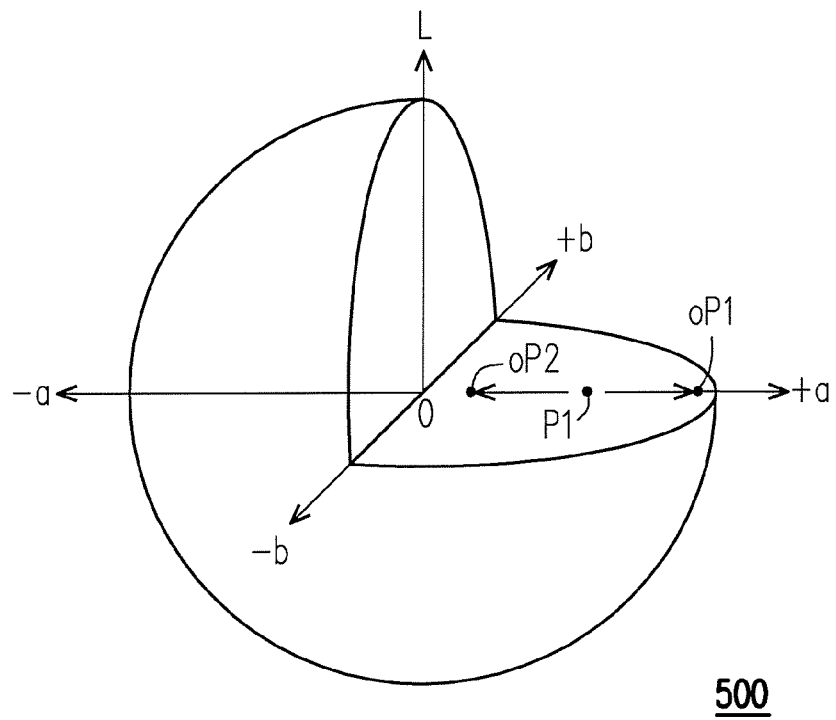
FIG. 7A, FIG. 7B and FIG. 7C are schematic diagrams respectively illustrating an image adjustment method based on the color space according to the embodiment of FIG. 5 and FIG. 6.
Figure 7B:
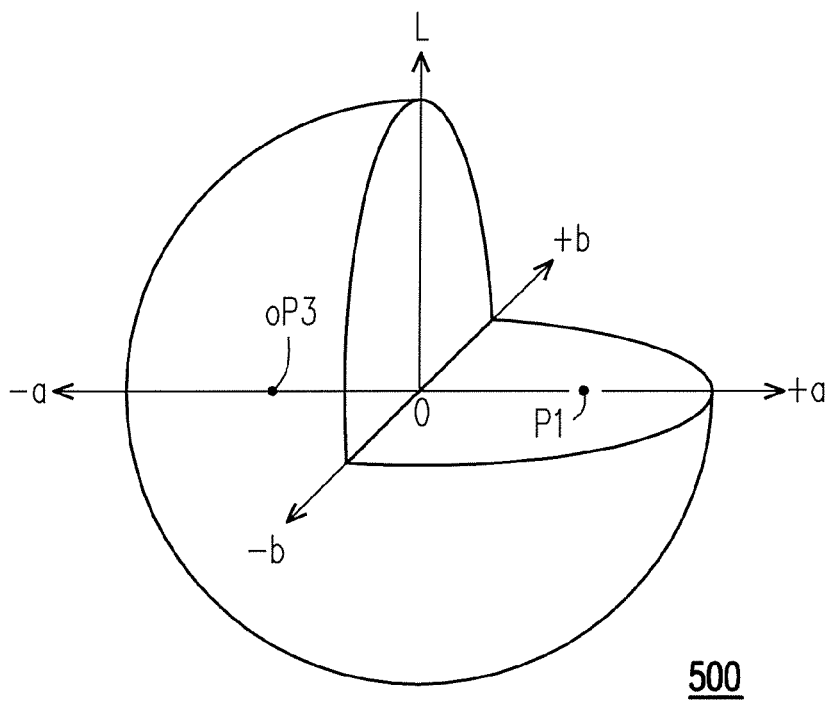
Figure 7C:
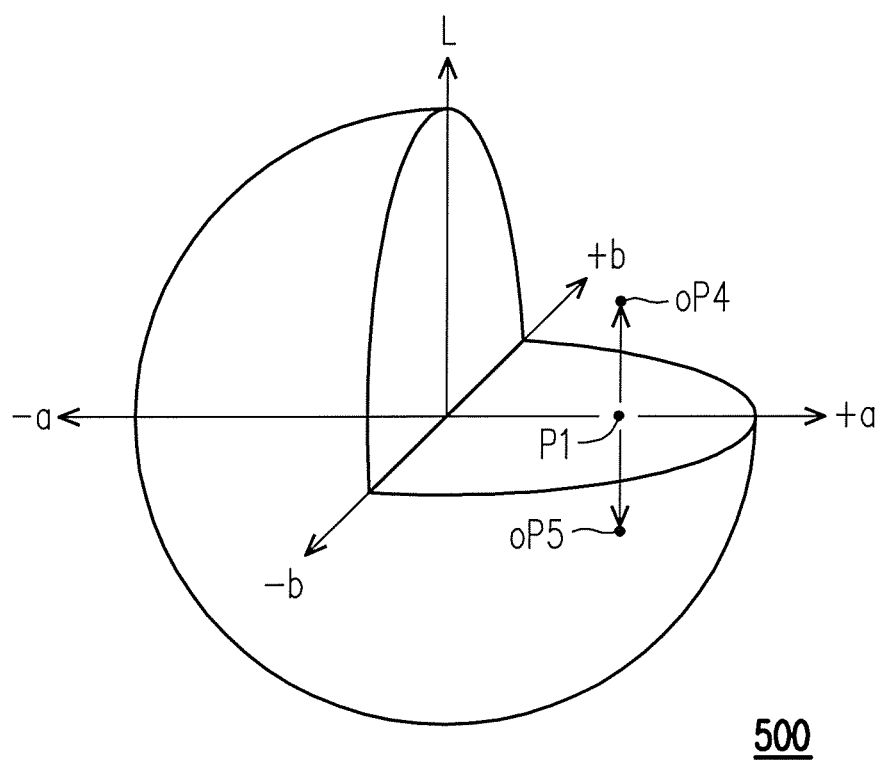

FIG. 7A, FIG. 7B and FIG. 7C are schematic diagrams respectively illustrating an image adjustment method based on the color space according to the embodiment of FIG. 5 and FIG. 6. For convenience to illustrate the adjustment of the display color when the color difference is smaller than the threshold value, only the position P1 converted from the display color is shown in FIG. 7A, FIG. 7B and FIG. 7C. However, it may be understood that the position P2 may be closed to the position P1 in these embodiments.

Referring to the embodiment illustrated in FIG. 7A at first, since the position P1 is on the a* axis with +a value, the processing unit 120 may change the saturation of the display color by shifting the position P1 within a range between the a value from 0 (i.e. center C) to +500 on the a* axis. For instance, the processing unit 120 may shift the position P1 to the position oP1 or the position oP2. It should be noted that the distance between the position P1 and the position oP1 and the distance between the position P1 and the position oP2 may be both greater than the threshold value.

Since the present embodiment in FIG. 7A may change the saturation of the display color by merely shifting the position P1 within the range of +a values on the a* axis rather than change the hue of the display color, the image adjustment method disclosed by the embodiment in FIG. 7A may be applied to, for example, natural images.

FIG. 7B illustrates an embodiment of the image adjustment method by changing the contrast of the display color. Since the opponent colors are represented along each of the axes in the color space 500, the processing unit 120 may change the contrast of the display color by shifting the position P1 to the opposite position with respect to the center C. For instance, the processing unit 120 may shift the position P1 to the position oP3, where the position oP3 may be within −a value from 0 to −500 on the a* axis. Similarly, the distance between the position P1 and the position oP3 should be greater than the threshold value. With respect to the saturation adjustment without changing the hue of the display image in the embodiment in FIG. 7A, the present embodiment in FIG. 7B may change the contrast of the display color, so as to change the hue of the display color, and may be particularly applied to text images accordingly.

In addition, the processing unit 120 may adjust the display image by changing the lightness of the display color. Referring to the embodiment illustrated in FIG. 7C, the processing unit 120 may change the lightness of the display color by shifting the position P1 by changing to different L values. For instance, the processing unit 120 may shift the position P1 upwards to the position oP4 to raise the lightness of the display color. Alternatively, the processing unit 120 may also shift the position P1 downwards to the position oP5 to lower the lightness of the display color. Through the present embodiment in FIG. 7C, the color difference between the display color and the background color may be increased by making the outline or the shape of the display image clear, and thereby the present embodiment may be applied to a low-light environment.

In the embodiments in FIG. 7A to FIG. 7C, the position P1 may be with the +a value on the a* axis for convenient description. However, other positions in the color space 500 may also be adapted to the adjustment methods disclosed by the embodiments in FIG. 7A to FIG. 7C. In addition, It is worth mentioning that the adjustment methods disclosed by the embodiments in FIG. 7A to FIG. 7C may be combined to use depending on design requirements, and thus the invention is not intend to limit thereto.

Referring to FIG. 4 again, in Step S450, the processing unit 120 outputs the adjusted display image at a second side S2 of the transparent display panel 110. Step S450 may be similar to Step S330 of the embodiment in FIG. 3, so the details are not mentioned here.

On the other hand, when the color difference is not smaller than the threshold value, that is, the display image may be recognized clearly, the processing unit 120 may not change each of the color attributes of the display color. Therefore, in Step S460, the processing unit 120 outputs the display image without image adjustment at the second side S2 of the transparent display panel 110.

Accordingly, the aforementioned embodiments may execute the color-space conversion operation to calculate the color difference between the display image and the background image. Further, whether to adjust the display color of the display image may be determined according to the color difference. Besides, the applied environment or the type of the display image may be also considered to determine that which one of the color attributes of the display color is adjusted, so as to increase the color difference and provide good display effects.

Figure 8:
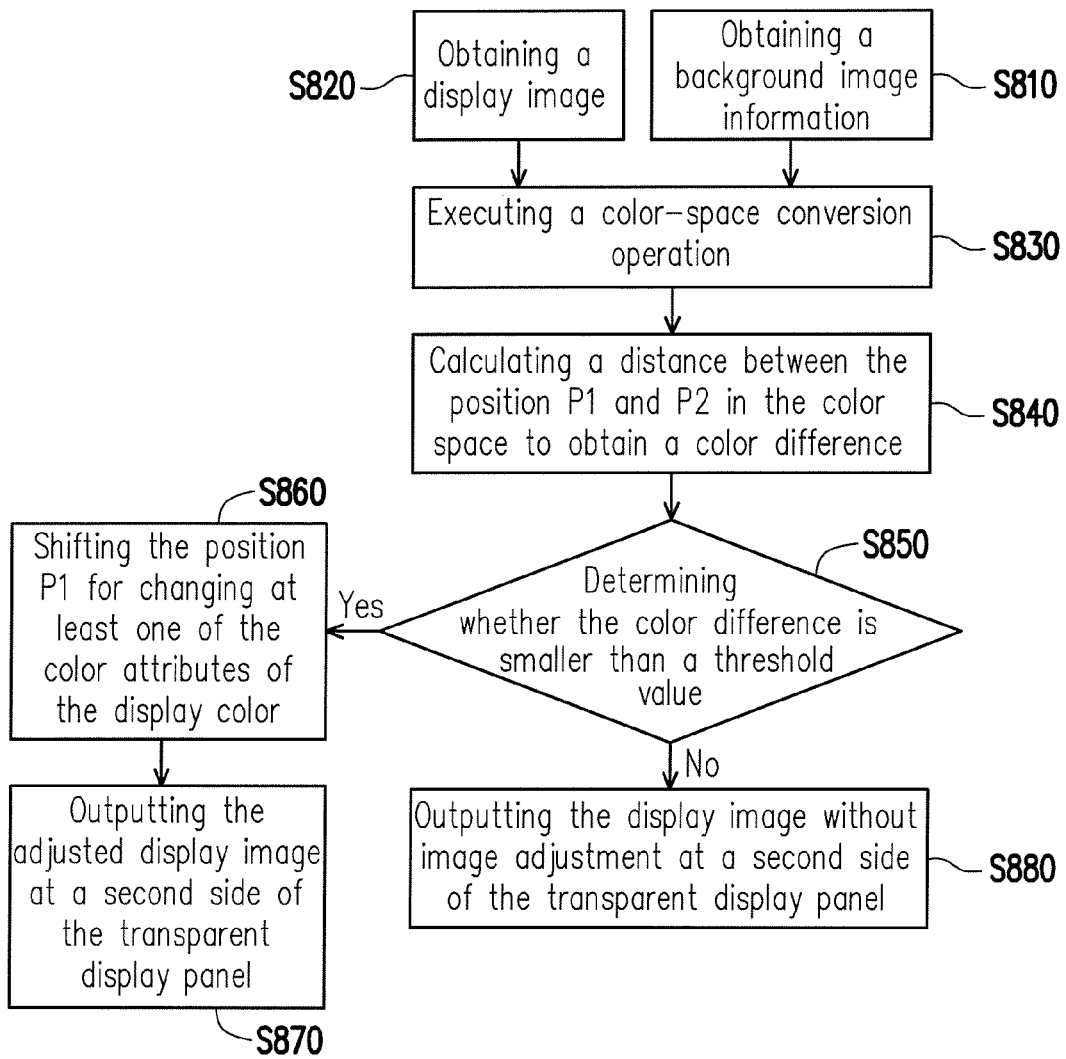
FIG. 8 is a flow chart illustrating an image adjustment method of a transparent display apparatus according to another embodiment of the invention.

FIG. 8 is a flow chart illustrating an image adjustment method of a transparent display apparatus according to another embodiment of the invention, which is also adapted to the transparent display apparatus 100 in FIG. 1 and FIG. 2. Besides, the color space 500 disclosed by the embodiments in FIG. 5 and FIG. 6 is utilized in the present embodiment.

Referring to FIG. 8, in Step S810, the processing unit 120 obtains a background image information according to a background scenery at a first side S1 of the transparent display panel 110. Step S810 in the present embodiment is similar to Step S310 and Step 410, and thus the details are not mentioned here.

In Step S820, the processing unit 120 obtains a display image. In an embodiment, the processing unit 120 may use at least one image information to drive the transparent display panel 110 to display. In other words, the processing unit 120 may obtain the display image and the display color through the image information.

In Step S830, the processing unit 120 executes a color-space conversion operation to respectively convert the display color and the background color into the position P1 and P2. In Step S840, the processing unit 120 calculates a distance D between the position P1 and P2 in the color space 500 to obtain a color difference. The Steps S830 and S840 have been described in detail in the embodiments of FIG. 5 and FIG. 6, so the details are not mentioned here.

Then, in Step S850, the processing unit 120 determines whether the color difference is smaller than a threshold value. When the color difference is smaller than the threshold value, in Step S860, the processing unit 120 shifts the position P1 for changing at least one of the color attributes of the display color. The processing unit 120 may adjusting at least one of saturation, contrast and lightness of the display color with reference to the embodiments in FIG. 7A, FIG. 7B and FIG. 7C, so the details are not mentioned here.

Afterwards, the processing unit 120 outputs the adjusted display image at a second side S2 of the transparent display panel 110 in Step S870.

As for the case that the color difference is not smaller than the threshold value, the processing unit 120 may not change each of the color attributes of the display color, and then output the display image without image adjustment at the second side S2 of the transparent display panel 110 in Step S880. Step S880 may be similar to the Step S460 of the embodiment in FIG. 4, so the details are not mentioned here.

To conclude the above, the embodiments disclosed by the invention may adjust at least one of the color attributes of the display image based on the color difference between the display color and the background color, and the color difference may be calculated through executing the color-space conversion operation. Besides, the applied environment is also considered. Accordingly, good display effects of the transparent display apparatus may be provided in consideration of the background scenery, the display image may be recognized easily, and therefore the readability of the display image may be enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image adjustment method of a transparent display apparatus, the transparent display apparatus comprising a transparent display panel, the image adjustment method comprising:
    obtaining a background image information according to a background scenery at a first side of the transparent display panel;
    adjusting at least one of a plurality of color attributes of a display image according to the background image information, wherein the step of adjusting at least one of the color attributes of the display image according to the background image information comprises:
    comparing a color difference between at least one display color of the display image and at least one background color of the background image information; and
    adjusting at least one of the color attributes of the display image according to the color difference; and
    outputting the adjusted display image at a second side of the transparent display panel.

2. The image adjustment method of the transparent display apparatus as claimed in claim 1, wherein the step of adjusting at least one of the color attributes of the display image according to the color difference comprises:
    comparing the color difference and a threshold value; and
    adjusting at least one of the color attributes of the display image according to a difference obtained by comparing the color difference and the threshold value.

3. The image adjustment method of the transparent display apparatus as claimed in claim 2, wherein the step of comparing the color difference between the display color of the display image and the background color of the background image information comprises:
    converting the display color into a first position in a color space;
    converting the background color into a second position in the color space; and
    calculating a distance between the first position and the second position in the color space to obtain the color difference.

4. The image adjustment method of the transparent display apparatus as claimed in claim 3, wherein the step of adjusting at least one of the color attributes of the display image according to the difference obtained by comparing the color difference and the threshold value comprises:
    when the color difference is smaller than the threshold value, shifting the first position for changing at least one of the color attributes of the display color according to the difference between the color difference and the threshold value; and
    when the color difference is not smaller than the threshold value, not changing each of the color attributes of the display color.

5. The image adjustment method of the transparent display apparatus as claimed in claim 1, wherein the transparent display apparatus further comprises a background image capturing unit, and the step of obtaining the background image information according to the background scenery at the first side of the transparent display panel comprises:
    capturing the background scenery at the first side of the transparent display panel to generate the background image information by the background image capturing unit.

6. The image adjustment method of the transparent display apparatus as claimed in claim 1, wherein the color attribute comprises saturation, contrast or lightness.

7. An image adjustment method of a transparent display apparatus, the transparent display apparatus comprising a transparent display panel, the image adjustment method comprising:
    obtaining a background image information according to a background scenery at a first side of the transparent display panel;
    comparing a display image of a second side of the transparent display panel and the background image information to obtain a color difference;
    adjusting at least one of a plurality of color attributes of the display image by comparing the color difference and a threshold value; and
    outputting the adjusted display image at the second side of the transparent display panel.

8. The image adjustment method of the transparent display apparatus as claimed in claim 7, wherein the step of comparing the display image of the second side of the transparent display panel and the background image information to obtain the color difference comprising:
    converting at least one display color of the display image into a first position in a color space;
    converting at least one background color of the background color into a second position in the color space; and
    calculating a distance between the first position and the second position in the color space to obtain the color difference.

9. The image adjustment method of the transparent display apparatus as claimed in claim 8, wherein the step of adjusting at least one of the color attributes of the display image by comparing the color difference and the threshold value comprising:
    when the color difference is smaller than the threshold value, shifting the first position for changing at least one of the color attributes of the display color according to the difference between the color difference and the threshold value; and
    when the color difference is not smaller than the threshold value, not changing each of the color attributes of the display color.

10. The image adjustment method of the transparent display apparatus as claimed in claim 7, wherein the transparent display apparatus further comprises a background image capturing unit, and the step of obtaining the background image information according to the background scenery at the first side of the transparent display panel comprises:
    capturing the background scenery at the first side of the transparent display panel to generate the background image information by the background image capturing unit.

11. The image adjustment method of the transparent display apparatus as claimed in claim 7, wherein the color attribute comprises saturation, contrast or lightness.

12. A transparent display apparatus, comprising:
    a transparent display panel, having a first side and a second side; and
    a processing unit, coupled to the transparent display panel, obtaining a background image information according to a background scenery at the first side of the transparent display panel, adjusting at least one of a plurality of color attributes of a display image according to the background image information, and outputting the adjusted display image at the second side of the transparent display panel, wherein the processing unit compares a color difference between at least one display color of the display image and at least one background color of the background image information, and adjusts at least one of the color attributes of the display image according to the color difference.

13. The transparent display apparatus as claimed in claim 12, wherein the processing unit compares the color difference and a threshold value, and adjusts at least one of the color attributes of the display image according to a difference obtained by comparing the color difference and the threshold value.

14. The transparent display apparatus as claimed in claim 13, wherein the processing unit converts the display color into a first position in a color space, converts the background color into a second position in the color space, and calculates a distance between the first position and the second position in the color space to obtain the color difference.

15. The transparent display apparatus as claimed in claim 14, wherein when the color difference is smaller than the threshold value, the processing unit shifts the first position for changing at least one of the color attributes of the display color according to the difference between the color difference and the threshold value, and when the color difference is not smaller than the threshold value, the processing unit do not change at least one of the color attributes of the display color.

16. The transparent display apparatus as claimed in claim 12, further comprising:
a background image capturing unit, coupled to the processing unit, capturing the background scenery at the first side of the transparent display panel to generate the background image information.

17. The transparent display apparatus as claimed in claim 12, wherein the color attribute comprises saturation, contrast or lightness.

* * * * *